(No Model.)
G. RENNERFELT.
ELECTRICAL METER.
No. 494,225. Patented Mar. 28, 1893.
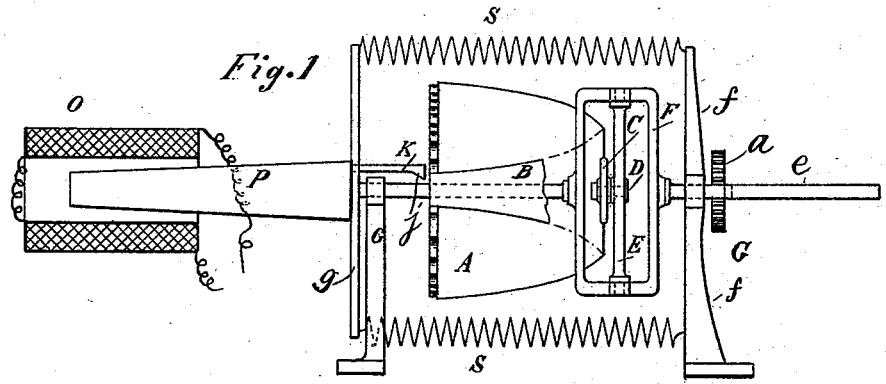
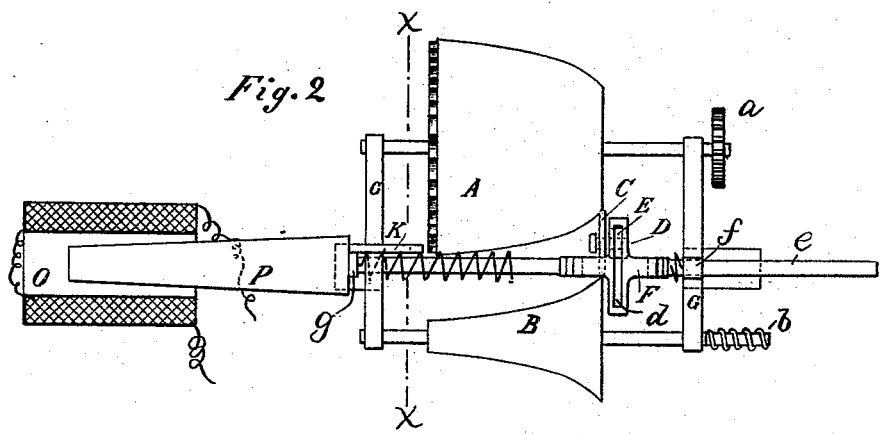
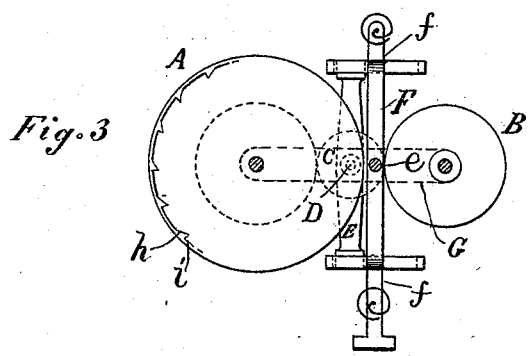
WITNESSES:
J. C. Gibson
J. H. Morgan
INVENTOR
Gus. Rennerfelt

UNITED STATES PATENT OFFICE.

GUSTAF RENNERFELT, OF BUFFALO, NEW YORK.

ELECTRICAL METER.

SPECIFICATION forming part of Letters Patent No. 494,225, dated March 28, 1893.

Application filed April 1, 1892. Serial No. 427,338. (No model.)

*To all whom it may concern:*

Be it known that I, GUSTAF RENNERFELT, a subject of the King of Sweden and Norway, and a resident of Buffalo, Erie county, New York, have invented new and useful Improvements in Electrical Meters, of which the following is a specification.

The object of my invention is to provide simpler and cheaper apparatus for variably actuating a register for recording the varying strength of an electric current as hereinafter described reference being made to the accompanying drawings in which:—

Figure 1, is a side elevation of the variable transmitting apparatus with a part broken out, and a section of the electro-magnet. Fig. 2, is a plan view of the said variable transmitting apparatus and section of the electro-magnet, and Fig. 3, is a transverse section on line $x\,x$, Fig. 2.

A represents a cone friction roll which is to be driven at a uniform rate of speed by any suitable means as a clock power to which it may be geared by the toothed wheel $a$, or in any other approved way.

B is a corresponding reverse cone roll which is to be geared with the registering apparatus (not shown) as by the worm $b$.

C is a friction wheel intermediate to the cones A and B, for transmitting motion from A to B. This wheel C is mounted so as to turn freely on the pivot stud D which is mounted in the axial plane of the cones A and B, said stud being fixedly attached to the bar E, which is at its ends arranged in the slide ways $d$, in a yoke F, carried by a sliding rod $e$, arranged in the plane of the axis of the cone A and B, and between them, and supported in the bars G, located at suitable positions beyond the ends of the cones, so that the yoke can traverse the length of the cones between them, and the sliding bar E carried in said yoke can at the same time traverse laterally thereto the space between the varying contours of the cones.

The rod $e$ is attached to one end of the iron plunger P of the coil O of wire through which passes the electric current to be recorded. Springs S attached to arms $f$ of one of the supporting bars G, and to the cross bar $g$, attached to the iron core or to rod $e$ normally tend to pull core P, away from coil O. When an electric current sufficiently strong traverses the coil O, core P is drawn within coil O, the springs $s$ are stretched and yoke F with friction wheel $c$ is drawn along to the greater diameter of A and the smaller diameter of B, which latter wheel will accordingly revolve faster, the outer surfaces of wheels A and B, being formed on a certain curve whereby the distance as measured perpendicularly to their axis is constant and equal to the diameter of C.

The curvatures of A and B are so shaped that the speed of wheel B will be proportional to the strength of the current.

Suppose for example that for the minimum current, say ten ampères, for which a certain size of the instrument is adapted the plunger is kept at the normal position, the wheel C is then making contact at equal diameters on A and B; the speed of B will then be such that it will cause the register in one hour to record ten ampère hours. If the current increases to twenty ampères the diameters of A and B, at points of contact with C, should bear the relation of two to one, and B having double the speed will in one hour register twenty ampère hours. For thirty ampères the ratio would be three to one &c. When no current, or one less than the minimum goes through the coil O, the springs $s$, keep the plunger back in the normal position, and a stop finger $k$, attached to the plunger P engages a notch $h$ in the head of the cone A to stop its rotation as by holding the clock power. The side of this finger against which the wall $i$, of the notch in the cone bears while holding the clock, is beveled as at $j$, and the bearing point of said wall on said beveled side is at a distance back of the end of the finger so that a back thrust is imparted to the cone when the plunger pulls the finger away therefrom, which facilitates the starting of the clock power automatically.

I claim—

1. In an electric meter the combination with the driving and driven cones, and the movable core of the electro-magnet, of the yoke connected with the core and movable thereby along and between the cones lengthwise, the bar movable transversely thereto in the slide ways of the yoke, and the transmitting friction wheel mounted on said bar in the plane of the axes of the rolls substantially as described.

2. In an electric meter the combination with the driving and driven cones, and the movable core of the electro-magnet, of the yoke connected with the core and movable thereby along and between the cones lengthwise, the bar movable transversely in the slide ways of the yoke, the transmitting friction wheel mounted on said bar in the plane of the axes of the rolls, and the springs opposing the pull of the electro-magnet substantially as described.

3. In an electric meter the combination with the driving and driven cones, one of said cones having the stop notches, the movable core of the electro-magnet, intermediate transmitting wheel and the retracting springs, of the stop finger on the said movable core adapted to engage a notch of said cone and lock the meter in the normal position substantially as described.

4. In an electric meter the combination with the driving and driven cones, one of said cones having the stop notches, the movable core of the electro-magnet, intermediate transmitting wheel and the retracting springs, of the stop finger on the movable core adapted to engage a notch of said cone, and lock the meter in the normal position, said finger having the back thrusting bevel side engaging the wall of the notch substantially as described.

In testimony that I claim the foregoing as my invention I have signed my name, in presence of two witnesses, this 9th day of March, 1892.

GUSTAF RENNERFELT.

Witnesses:
   H. C. GREEN,
   GEO. A. KERR.